(12) United States Patent
Islam et al.

(10) Patent No.: US 8,275,720 B2
(45) Date of Patent: Sep. 25, 2012

(54) EXTERNAL SCOPING SOURCES TO DETERMINE AFFECTED PEOPLE, SYSTEMS, AND CLASSES OF INFORMATION IN LEGAL MATTERS

(75) Inventors: Nazrul Islam, San Jose, CA (US); Deidre Paknad, Palo Alto, CA (US); Pierre Raynaud-Richard, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 12/138,326

(22) Filed: Jun. 12, 2008

(65) Prior Publication Data

US 2009/0313196 A1    Dec. 17, 2009

(51) Int. Cl.
*G06Q 50/00* (2006.01)
*G06Q 10/00* (2006.01)

(52) U.S. Cl. ............... 705/311; 705/1.1; 705/342
(58) Field of Classification Search .................. None
See application file for complete search history.

(56) References Cited

U.S. PATENT DOCUMENTS

| | | | |
|---|---|---|---|
| 5,355,497 A | 10/1994 | Cohen-Levy | |
| 5,608,865 A | 3/1997 | Midgely et al. | |
| 5,701,472 A | 12/1997 | Koerber et al. | |
| 5,875,431 A | 2/1999 | Heckman et al. | |
| 5,903,879 A | 5/1999 | Mitchell | |
| 5,963,964 A | 10/1999 | Nielsen | |
| 6,049,812 A | 4/2000 | Bertram et al. | |
| 6,115,642 A * | 9/2000 | Brown et al. | 700/104 |
| 6,128,620 A | 10/2000 | Pissanos et al. | |
| 6,151,031 A | 11/2000 | Atkins et al. | |
| 6,173,270 B1 | 1/2001 | Cristofich et al. | |
| 6,330,572 B1 | 12/2001 | Sitka | |
| 6,332,125 B1 | 12/2001 | Callen et al. | |
| 6,343,287 B1 * | 1/2002 | Kumar et al. | 1/1 |

(Continued)

FOREIGN PATENT DOCUMENTS

EP    2110781 A1    10/2009

OTHER PUBLICATIONS www.pss-systems.com; any linkage Apr. 18, 2007. www.archive.org.*

(Continued)

*Primary Examiner* — Traci Casler
(74) *Attorney, Agent, or Firm* — Shumaker & Sieffert, P.A.

(57) ABSTRACT

When creating exhaustive, affected lists within a request scope, any legal risk due to failure to identify or leverage existing knowledge of a company about custody of evidence related to a legal matter is minimized. Accurate affected lists are constructed for an ongoing or impending litigation. Affected people, systems, or record types are included at first, and the list is modified over time once their exact association to the litigation context is clarified (new ones are added, not required are removed). Automation of data capture eliminates the risk of human error during data entry. Conflict resolution is applied when the same person, system, or record type is identified in the request scope, as part of multiple affiliations and associations. Overlapping lists are automatically merged to enable simple and efficient processing, without having to cull different lists. Affected elements in the request scope that could otherwise be missed are tracked and added. A relevant list of all affected elements based on multiple likely inconsistent sources of knowledge dispersed throughout a company is created, with a high degree of confidence in the context of an ongoing litigation or an impending litigation.

42 Claims, 7 Drawing Sheets

U.S. PATENT DOCUMENTS

| | | |
|---|---|---|
| 6,401,079 B1 | 6/2002 | Kahn et al. |
| 6,425,764 B1 | 7/2002 | Lamson |
| 6,460,060 B1 | 10/2002 | Maddalozzo, Jr. et al. |
| 6,539,379 B1 | 3/2003 | Vora et al. |
| 6,553,365 B1 | 4/2003 | Summerlin et al. |
| 6,607,389 B2 | 8/2003 | Genevie |
| 6,622,128 B1 | 9/2003 | Bedell et al. |
| 6,738,760 B1* | 5/2004 | Krachman ........................... 1/1 |
| 6,805,351 B2 | 10/2004 | Nelson |
| 6,832,205 B1 | 12/2004 | Aragones et al. |
| 6,839,682 B1 | 1/2005 | Blume et al. |
| 6,944,597 B2 | 9/2005 | Callen et al. |
| 6,966,053 B2 | 11/2005 | Paris et al. |
| 6,976,083 B1 | 12/2005 | Baskey et al. |
| 6,981,210 B2 | 12/2005 | Peters et al. |
| 7,076,439 B1 | 7/2006 | Jaggi |
| 7,082,573 B2 | 7/2006 | Apparao et al. |
| 7,103,601 B2 | 9/2006 | Nivelet |
| 7,103,602 B2 | 9/2006 | Black et al. |
| 7,104,416 B2 | 9/2006 | Gasco et al. |
| 7,107,416 B2* | 9/2006 | Stuart et al. ................... 711/159 |
| 7,127,470 B2 | 10/2006 | Takeya |
| 7,146,388 B2 | 12/2006 | Stakutis et al. |
| 7,162,427 B1 | 1/2007 | Myrick et al. |
| 7,197,716 B2 | 3/2007 | Newell |
| 7,206,789 B2* | 4/2007 | Hurmiz et al. ........................ 1/1 |
| 7,225,249 B1 | 5/2007 | Barry et al. |
| 7,233,959 B2 | 6/2007 | Kanellos et al. |
| 7,236,953 B1 | 6/2007 | Cooper et al. |
| 7,240,296 B1 | 7/2007 | Matthews et al. |
| 7,249,315 B2 | 7/2007 | Moetteli |
| 7,281,084 B1 | 10/2007 | Todd et al. |
| 7,283,985 B2 | 10/2007 | Schauerte et al. |
| 7,284,985 B2 | 10/2007 | Genevie |
| 7,333,989 B1 | 2/2008 | Sameshima et al. |
| 7,386,468 B2 | 6/2008 | Calderaro et al. |
| 7,433,832 B1 | 10/2008 | Bezos et al. |
| 7,451,155 B2 | 11/2008 | Slackman et al. |
| 7,478,096 B2 | 1/2009 | Margolus et al. |
| 7,496,534 B2 | 2/2009 | Olsen et al. |
| 7,502,891 B2 | 3/2009 | Shachor |
| 7,512,636 B2 | 3/2009 | Verma et al. |
| 7,558,853 B2 | 7/2009 | Alcorn et al. |
| 7,580,961 B2* | 8/2009 | Todd et al. ............................ 1/1 |
| 7,594,082 B1* | 9/2009 | Kilday et al. ................. 711/154 |
| 7,596,541 B2 | 9/2009 | deVries et al. |
| 7,600,086 B2* | 10/2009 | Hochberg et al. ............. 711/160 |
| 7,614,004 B2 | 11/2009 | Milic-Frayling et al. |
| 7,617,458 B1 | 11/2009 | Wassom, Jr. et al. |
| 7,636,886 B2 | 12/2009 | Wyle et al. |
| 7,720,825 B2 | 5/2010 | Pelletier et al. |
| 7,730,113 B1* | 6/2010 | Payette et al. ................. 707/821 |
| 7,730,148 B1 | 6/2010 | Mace et al. |
| 7,742,940 B1 | 6/2010 | Shan et al. |
| 7,774,721 B2 | 8/2010 | Milic-Frayling et al. |
| 7,861,166 B1 | 12/2010 | Hendricks |
| 7,865,817 B2 | 1/2011 | Ryan et al. |
| 7,895,229 B1 | 2/2011 | Paknad |
| 7,962,843 B2 | 6/2011 | Milic-Frayling et al. |
| 8,073,729 B2 | 12/2011 | Kisin et al. |
| 2001/0053967 A1 | 12/2001 | Gordon et al. |
| 2002/0007333 A1 | 1/2002 | Scolnik et al. |
| 2002/0010708 A1 | 1/2002 | McIntosh |
| 2002/0022982 A1 | 2/2002 | Cooperstone et al. |
| 2002/0035480 A1 | 3/2002 | Gordon et al. |
| 2002/0083090 A1 | 6/2002 | Jeffrey et al. |
| 2002/0091553 A1 | 7/2002 | Callen et al. |
| 2002/0091836 A1 | 7/2002 | Moetteli |
| 2002/0095416 A1 | 7/2002 | Schwols |
| 2002/0103680 A1 | 8/2002 | Newman |
| 2002/0108104 A1 | 8/2002 | Song et al. |
| 2002/0119433 A1 | 8/2002 | Callender |
| 2002/0120859 A1 | 8/2002 | Lipkin et al. |
| 2002/0123902 A1 | 9/2002 | Lenore et al. |
| 2002/0143595 A1 | 10/2002 | Frank et al. |
| 2002/0143735 A1 | 10/2002 | Ayi et al. |
| 2002/0147801 A1 | 10/2002 | Gullotta et al. |
| 2002/0162053 A1 | 10/2002 | Os |
| 2002/0178138 A1 | 11/2002 | Ender et al. |
| 2002/0184068 A1 | 12/2002 | Krishnan et al. |
| 2002/0184148 A1 | 12/2002 | Kahn et al. |
| 2003/0004985 A1 | 1/2003 | Kagimasa et al. |
| 2003/0014386 A1 | 1/2003 | Jurado |
| 2003/0018520 A1 | 1/2003 | Rosen |
| 2003/0018663 A1 | 1/2003 | Cornette et al. |
| 2003/0031991 A1 | 2/2003 | Genevie |
| 2003/0033295 A1 | 2/2003 | Adler et al. |
| 2003/0036994 A1 | 2/2003 | Witzig et al. |
| 2003/0046287 A1 | 3/2003 | Joe |
| 2003/0051144 A1 | 3/2003 | Williams |
| 2003/0069839 A1 | 4/2003 | Whittington et al. |
| 2003/0074354 A1 | 4/2003 | Lee et al. |
| 2003/0097342 A1 | 5/2003 | Whittingtom |
| 2003/0110228 A1 | 6/2003 | Xu et al. |
| 2003/0139827 A1 | 7/2003 | Phelps |
| 2003/0229522 A1 | 12/2003 | Thompson et al. |
| 2004/0002044 A1 | 1/2004 | Genevie |
| 2004/0003351 A1 | 1/2004 | Sommerer et al. |
| 2004/0019496 A1 | 1/2004 | Angle et al. |
| 2004/0034659 A1 | 2/2004 | Steger |
| 2004/0039933 A1 | 2/2004 | Martin et al. |
| 2004/0060063 A1 | 3/2004 | Russ et al. |
| 2004/0068432 A1 | 4/2004 | Meyerkopf et al. |
| 2004/0078368 A1* | 4/2004 | Excoffier et al. ................. 707/4 |
| 2004/0088283 A1 | 5/2004 | Lissar et al. |
| 2004/0088332 A1 | 5/2004 | Lee et al. |
| 2004/0088729 A1 | 5/2004 | Petrovic et al. |
| 2004/0103284 A1 | 5/2004 | Barker |
| 2004/0133573 A1 | 7/2004 | Miloushev et al. |
| 2004/0138903 A1 | 7/2004 | Zuniga |
| 2004/0143444 A1 | 7/2004 | Opsitnick et al. |
| 2004/0187164 A1 | 9/2004 | Kandasamy et al. |
| 2004/0193703 A1 | 9/2004 | Loewy et al. |
| 2004/0204947 A1 | 10/2004 | Li et al. |
| 2004/0215619 A1 | 10/2004 | Rabold |
| 2004/0216039 A1 | 10/2004 | Lane et al. |
| 2004/0260569 A1 | 12/2004 | Bell et al. |
| 2005/0060175 A1 | 3/2005 | Farber et al. |
| 2005/0071251 A1 | 3/2005 | Linden et al. |
| 2005/0071284 A1 | 3/2005 | Courson et al. |
| 2005/0074734 A1 | 4/2005 | Randhawa |
| 2005/0114241 A1 | 5/2005 | Hirsch et al. |
| 2005/0144114 A1 | 6/2005 | Ruggieri et al. |
| 2005/0160361 A1 | 7/2005 | Young |
| 2005/0165734 A1 | 7/2005 | Vicars et al. |
| 2005/0187813 A1 | 8/2005 | Genevie |
| 2005/0203821 A1 | 9/2005 | Petersen et al. |
| 2005/0240578 A1 | 10/2005 | Biederman et al. |
| 2005/0246451 A1 | 11/2005 | Silverman et al. |
| 2005/0283346 A1 | 12/2005 | Elkins, II et al. |
| 2006/0036464 A1 | 2/2006 | Cahoy et al. |
| 2006/0036649 A1 | 2/2006 | Simske et al. |
| 2006/0074793 A1 | 4/2006 | Hibbert et al. |
| 2006/0095421 A1 | 5/2006 | Nagai et al. |
| 2006/0126657 A1 | 6/2006 | Beisiegel et al. |
| 2006/0136435 A1 | 6/2006 | Nguyen et al. |
| 2006/0143248 A1 | 6/2006 | Nakano et al. |
| 2006/0143464 A1 | 6/2006 | Ananthanarayanan et al. |
| 2006/0149407 A1 | 7/2006 | Markham et al. |
| 2006/0149735 A1* | 7/2006 | DeBie et al. ...................... 707/8 |
| 2006/0156381 A1* | 7/2006 | Motoyama ........................ 726/1 |
| 2006/0156382 A1 | 7/2006 | Motoyama |
| 2006/0167704 A1 | 7/2006 | Nicholls et al. |
| 2006/0174320 A1 | 8/2006 | Maru et al. |
| 2006/0178917 A1 | 8/2006 | Merriam et al. |
| 2006/0184718 A1 | 8/2006 | Sinclair |
| 2006/0195430 A1 | 8/2006 | Arumainayagam et al. |
| 2006/0229999 A1 | 10/2006 | Dodell et al. |
| 2006/0230044 A1 | 10/2006 | Utiger |
| 2006/0235899 A1 | 10/2006 | Tucker |
| 2006/0242001 A1 | 10/2006 | Heathfield |
| 2007/0016546 A1 | 1/2007 | De Vorchik et al. |
| 2007/0048720 A1 | 3/2007 | Billauer |
| 2007/0061156 A1 | 3/2007 | Fry et al. |
| 2007/0061157 A1 | 3/2007 | Fry et al. |
| 2007/0078900 A1 | 4/2007 | Donahue |
| 2007/0099162 A1 | 5/2007 | Sekhar |

| | | |
|---|---|---|
| 2007/0100857 A1 | 5/2007 | DeGrande et al. |
| 2007/0112783 A1 | 5/2007 | McCreight et al. |
| 2007/0118556 A1 | 5/2007 | Arnold et al. |
| 2007/0156418 A1 | 7/2007 | Richter et al. |
| 2007/0162417 A1 | 7/2007 | Cozianu et al. |
| 2007/0179829 A1 | 8/2007 | Laperi et al. |
| 2007/0203810 A1 | 8/2007 | Grichnik |
| 2007/0208690 A1 | 9/2007 | Schneider et al. |
| 2007/0219844 A1 | 9/2007 | Santorine et al. |
| 2007/0220435 A1 | 9/2007 | Sriprakash et al. |
| 2007/0271308 A1 | 11/2007 | Bentley et al. |
| 2007/0271517 A1 | 11/2007 | Finkelman et al. |
| 2007/0282652 A1 | 12/2007 | Childress et al. |
| 2007/0288659 A1 | 12/2007 | Zakarian et al. |
| 2008/0033904 A1* | 2/2008 | Ghielmetti et al. ............... 707/1 |
| 2008/0034003 A1 | 2/2008 | Stakutis et al. |
| 2008/0059265 A1 | 3/2008 | Biazetti et al. |
| 2008/0059543 A1 | 3/2008 | Engel |
| 2008/0070206 A1 | 3/2008 | Perilli |
| 2008/0071561 A1 | 3/2008 | Holcombe |
| 2008/0126156 A1 | 5/2008 | Jain et al. |
| 2008/0147642 A1 | 6/2008 | Leffingwell et al. |
| 2008/0148193 A1 | 6/2008 | Moetteli |
| 2008/0148346 A1 | 6/2008 | Gill et al. |
| 2008/0154969 A1 | 6/2008 | DeBie |
| 2008/0154970 A1 | 6/2008 | DeBie |
| 2008/0177790 A1 | 7/2008 | Honwad |
| 2008/0195597 A1 | 8/2008 | Rosenfeld et al. |
| 2008/0209338 A1 | 8/2008 | Li |
| 2008/0229037 A1 | 9/2008 | Bunte et al. |
| 2008/0294674 A1 | 11/2008 | Reztlaff et al. |
| 2008/0301207 A1 | 12/2008 | Demarest et al. |
| 2008/0312980 A1 | 12/2008 | Boulineau et al. |
| 2008/0319958 A1 | 12/2008 | Bhattacharya et al. |
| 2008/0319984 A1 | 12/2008 | Proscia et al. |
| 2009/0037376 A1 | 2/2009 | Archer et al. |
| 2009/0043625 A1 | 2/2009 | Yao |
| 2009/0064184 A1 | 3/2009 | Chacko et al. |
| 2009/0094228 A1* | 4/2009 | Bondurant et al. ............... 707/5 |
| 2009/0100021 A1 | 4/2009 | Morris et al. |
| 2009/0106815 A1 | 4/2009 | Brodie et al. |
| 2009/0119677 A1 | 5/2009 | Stefansson et al. |
| 2009/0150168 A1* | 6/2009 | Schmidt ............................ 705/1 |
| 2009/0150866 A1* | 6/2009 | Schmidt ........................ 717/120 |
| 2009/0150906 A1* | 6/2009 | Schmidt et al. ............... 719/317 |
| 2009/0193210 A1* | 7/2009 | Hewett et al. ................. 711/163 |
| 2009/0241054 A1 | 9/2009 | Hendricks |
| 2009/0249179 A1 | 10/2009 | Shieh et al. |
| 2009/0249446 A1 | 10/2009 | Jenkins et al. |
| 2009/0254572 A1 | 10/2009 | Redlich et al. |
| 2009/0287658 A1 | 11/2009 | Bennett |
| 2010/0017756 A1 | 1/2010 | Wassom, Jr. et al. |
| 2010/0050064 A1 | 2/2010 | Liu et al. |
| 2010/0070315 A1 | 3/2010 | Lu et al. |
| 2010/0088583 A1 | 4/2010 | Schachter |
| 2010/0251109 A1 | 9/2010 | Jin et al. |
| 2011/0191344 A1 | 8/2011 | Jin et al. |

OTHER PUBLICATIONS www.sherpasoftware.com; any liknage May 13, 2006 retrieved from www.archive.org.*

Zhu, et al.; "Query Expansion Using Web Access Log Files"; Lecture Notes in Computer Science, 2005, vol. 3588/2005, pp. 686-695, Springer-Verlag Berlin Hedelberg.

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc., Preservation Benchmarks for 2007 and Beyond, www.pss-systems.com, pp. 1-3 (2007).

PSS Sytems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

www.pss-systems.com; retrieved from www.Archive.org any linkage dated Dec. 8, 2005, 131 pages.

PSS Systems, Inc., Litigation Communications and Collections, www.pss-systems.com (2006), retrieved online on Dec. 8, 2010 from archive.org, 1 page.

Human Capital Mangement; "mySAP . . . management"; retrieved from archive.org Aug. 18, 2009 www.sap.com.

Cohasset Associates, "White Paper: Compliance Requirements Assessment, IBM DB2 Records Manager and Record-Enabled Solutions", Oct. 2004, 54 pgs.

"HEI Records Management: Guidance on Developing a File Plan", JISC infoNet, Jan. 2007, 7 pgs.

Lewis "Digital Mountin—Where Data Resides—Data Discovery from the Inside Out", available at http://digitalmountain.com/fullaccess/Article3.pdf accessed Mar. 13, 2012, Digital Mountain, Inc., 2004, 5 pgs.

Sears "E-Discovery: A Tech Tsunami Rolls In", available at http://www.krollontrack.com/publications/ediscoverybackgroundpaper.pdf, accessed Mar. 13, 2012, National Court Reporters Association, Apr. 2006, 7 pgs.

* cited by examiner

CSV Import

Browse File and import

Element Type [Person ▼]

File [_____] (Browse)

(Import)

Annotation

Reason [Added people from Casey's CSV file]

(Add to Request Scope)

Imported Results and Selection

(Select All)

+ Joe Smith
+ John Doe
+ Alice Lue

Selected x Joe Smith
x Alice

*FIG. 1*

External Source: Distribution List

Distribution List Details

Name [ Dev-all ]

( Import )

Annotation

Reason [ Added people from Casey's Outlook distribution list ]

( Add to Request Scope )

Imported Results and Selection

+ Joe Smith
+ John Doe
+ Alice Lue ( Select All )

Selected x Joe Smith
x Alice

*FIG. 2*

External Source: Connector

Select Connector and search configuration

Connector: External Source 1, External Source 2, External Source 3, External Source 4, External Source 5

Mode: ● Manual   ○ Continuous

Filter: Parameter 1, Parameter 2, Parameter 3

(Import)

Search Results and Selection

+ Data Source 1
+ Data Source 2
+ Data Source 3

(Select All)

(Add to Request Scope)

Annotation

Reason: Adding list of external data sources retrieved from external repository of such information.

Selected x Data Source 1
x Data Source 2

External Source: LDAP

Search

Test 1 Server
Test 2 Server
Test 3 Server
Test 4 Server
Test 5 Server
Test 6 Server Mode: ● Manual  ○ Continuous Filter Criteria: [          ]  (Search)

Annotation

Reason: Added affected people form Test Server 3 for geography USA

Selected x Joe Smith
x Alice

Search Results and Selection  (Select All)

+ Joe Smith
+ John Doe
+ Alice Lue (Add to Request Scope)

*Matter : XYZ Vv. PQR*
*Request: R3*
*Operation: Added 3 people to request scope*
*Type: External Source (Distribution List : dev-all)*
*Mode: Manual*
*Operator: John Smith (Paralegal)*

List of people added:
Jane Ho
Joe Blow
Alice Chang

The above list of people will be receiving the following notifications:
Legal Hold Notice: *LH1*
Individual Collection Notice: *IC1,IC2*

---

*Matter : XYZ Vv. PQR*
*Request: R3*
*Operation: Added 3 people to request scope*
*Type: External Source ( LDAP Server 3 )*
*Mode: Continuous*
*Operator: System*

List of people added:
Jane Ho
Joe Blow
Alice Chang

The above list of people will be receiving the following notifications:
Legal Hold Notice: *LH1*
Individual Collection Notice: *IC1,IC2*

*FIG. 6*

EXTERNAL SCOPING SOURCES TO DETERMINE AFFECTED PEOPLE, SYSTEMS, AND CLASSES OF INFORMATION IN LEGAL MATTERS

BACKGROUND OF THE INVENTION

1. Technical Field

The invention relates to software technology for identifying and preserving evidence in litigation. More particularly, the invention relates to external scoping sources to determine affected people, systems, and classes of information in legal matters.

2. Description of the Prior Art

To identify affected elements accurately, e.g. people, systems, and classes of information, that may contain or have custody of evidence in anticipation of litigation or during litigation is a dynamic and complex process. In this context, the term "affected" means "having custody or potentially having custody of evidence." A class of information is defined as a categorization of business documents, based on their function and purpose, also commonly referred to as a "record type."

Enterprises have a multitude of information silos where information about people, systems, and record types is maintained and managed. The problem of identifying people, systems, and class of information is further complicated by the fact that this information is trapped within applications and data stores in various forms and formats. Trying to refine the list of affected people starting with a list that is not comprehensive usually results in a list of limited accuracy.

In common cases, a significant part of the knowledge about relationships between people, systems, and record types may be captured in various disparate systems throughout the company. To be able to use this knowledge to identify affected elements, one must:

Identify all systems that are potential sources of knowledge of these relationships and, consequently, sources of knowledge of affected people, systems, or record types.

Provide communication channels to transfer this information efficiently into the context of an impending litigation or current litigation that tracks which elements are affected, commonly referred to as a "request scope."

Collaboratively and efficiently manage the affected lists of the request scope to keep them accurate in the context of an impending litigation or during litigation.

Provide accurate reporting on where any parts of the affected lists originated.

The above steps are usually iterative.

It would be advantageous to provide a method and apparatus that enables a thorough, quicker, and cheaper approach to creating exhaustive, affected lists within a request scope. It would also be advantageous to minimize any legal risk due to failure to identify or leverage existing knowledge of a company about whom or what may have custody of evidence related to a legal matter.

SUMMARY OF THE INVENTION

An embodiment of the invention provides a method and apparatus that enables a thorough, quicker, and cheaper approach to creating exhaustive, affected lists within a request scope.

An embodiment of the invention also provides a method and apparatus to minimize any legal risk due to failure to identify or leverage existing knowledge of a company about whom or what may have custody of evidence related to a legal matter.

It is important to construct accurate affected lists as quickly as possible in the case of an ongoing litigation, or in the context of an impending litigation. When in doubt, it is much more important to include all affected people, systems, or record types at first, and then trim the list over time once their exact role is clarified. An embodiment of the invention provides a method and apparatus to build exhaustive affected lists in the request scope efficiently and quickly.

An embodiment of the invention also provides the following high level functionality:

Automation of data capture to eliminate the risk of human error during data entry.

Conflict resolution when the same person, system, or record type is identified in the request scope, as part of multiple affiliations and associations. The automation automatically merges overlapping lists to enable simple and efficient processing, without having to cull different lists.

An embodiment of the invention makes it simple to track and add affected elements into the request scope that could otherwise be missed. It provides a simple and efficient way to create a single list of all affected elements based on multiple likely inconsistent sources of knowledge dispersed throughout a company.

BRIEF DESCRIPTION OF THE DRAWINGS

FIG. 1 is screen shot showing an import through CSV files according to the invention;

FIG. 2 is screen shot showing an import using a mailing list lookup according to the invention;

FIG. 4 is screen shot showing an import using a Web Service based lookup via Connectors according to the invention;

FIG. 5 is screen shot showing an import using a LDAP lookup according to the invention; and FIG. 6 is a screen shot showing an example of implementation of the ability to alert on the change of request scope according to the invention.

DETAILED DESCRIPTION OF THE INVENTION

Implementation—The Knowledge Base

Figure 3:
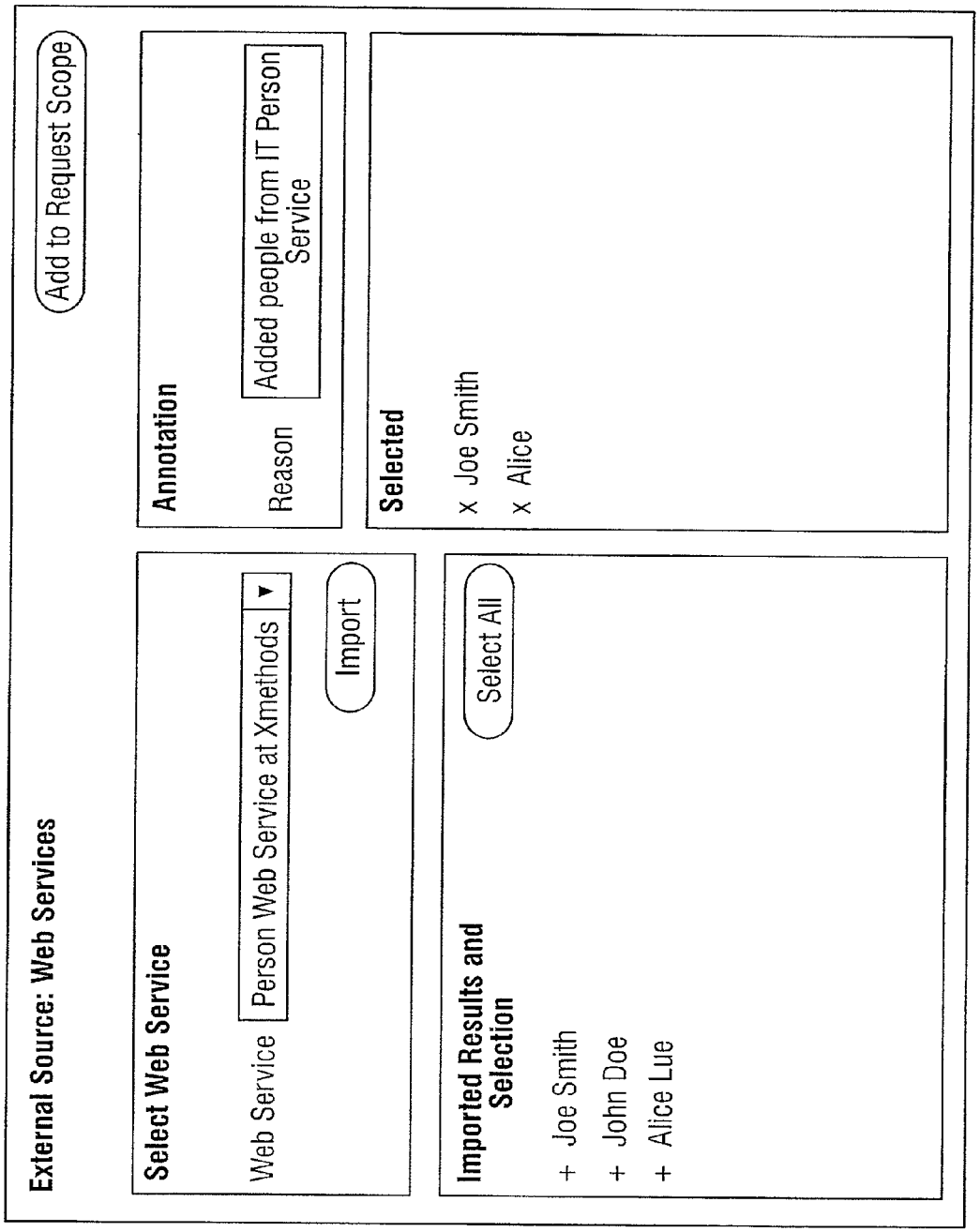
FIG. 3 is screen shot showing an import using a Web Service lookup according to the invention.

An embodiment of the invention leverages key information captured by the invention disclosed in the following document, and provides an extension from persons and systems to track request scope in terms of affected record types. This document is incorporated herein in its entirety by this reference thereto: [PA3697US], U.S. patent application Ser. No. 11/505,537, Systems and Methods for Utilizing an Enterprise Map to Determine Affected People and Systems, filed.

Implementation—Data Aggregation Approach

An embodiment of the invention creates, manages, and maintains a list of external sources that are able to provide a list of affected people, based upon specific litigation context parameters. Communication protocols are provided that enable the import of a list of affected elements from the external sources. A user interface triggers or executes the import of the affected list using the communication protocol. Conflicts between different affected lists imported in the same request scope are resolved, as are conflicts between different affected lists from the same external source which are imported at different points in time. External systems are tracked, displayed, and reported with regard to where each element in the affected list originated, modifications that occurred after the initial import, and all reasons provided by the operator or the external source to justify the initial import or the follow-up changes.

Affected lists that could be tracked in external sources include, for example:

Persons who are not part of the enterprise, e.g. Contractors and Service Providers;

Hosted systems or repositories that are not managed and maintained within the company;

Persons, systems, and classes of information that were jointly involved in the same project, where a project describes any temporary association of persons from one or multiple organizations, using specific systems to store information in the form of a specific set of information classes, as used in the specific context of the project;

Persons catalogs in LDAP, Active Directory, and other IT data stores of person information;

Persons catalogs from HR systems, financial systems, and other information systems that maintain employee information via Web services calls/APIs;

Persons lists defined based on an access list of structured applications via application specific APIs. For example, an application administrator knows the people accessing the application and the context. This embodiment provides a list of persons, and their unique ID, that accessed a certain file in a document management systems or a source control system;

Persons from mail servers, e.g. distribution lists and aliases. Those that reflect a common functional context and access to information;

Isolated partial lists of data sources. Systems are dynamically provisioned in a company, i.e. some new systems become available and old systems go offline. It is difficult to keep any single source of truth updated to the extent of complete confidence because there is a time lag between IT implemented changes to the inventory list and tracking by legal applications that manage the business process of litigation. Provisioning such external systems and people responsible for such systems, data and evidence, makes it possible to capture them into the request scope within the context of litigation, for example CSV lists of assets, e.g. data storage systems, can be imported into the request scope; asset lists can be imported using more tighter integration mechanisms with applications that manage IT assets via Web service calls/APIs; and any repository of data and evidence, e.g. not restricted to building, warehouse, garage or file cabinet address, can be imported into the request scope.

A similar tracking and conflict resolution problem exists in enterprises that have started a retention management program, but still suffer from large gap between the creation and the classification of the data. This means that a large amount of data may not yet be classified or tracked in the central retention management program. As the process for identification of potential evidence progresses, some specific silo of unclassified data may be investigated and classified. At this point the relevant classes of information become immediately known and should be imported into the request scope through, for example, the following steps:

CSV import of record types into the request scope;

Manage association of such record types with external data sources imported; and Inclusion of such data sources into the request scope when external record types are included.

An implementation of a mechanism for creating, managing, and maintaining a list of external sources containing people, systems or classes of information is provided in the following example:

Integration with LDAP, where a list of sources of affected elements is described as LDAP server details, e.g. hostname, port number, and security credentials. Import of affected list can be performed as a single LDAP lookup.

Web Service URLs can be managed as a source of affected elements. Import of affected elements can be performed as a single Web service call.

Connector configuration URLs can be managed for connector type integration, where the connector provides a range of services that can be discovered through a single configuration services. This can support a more sophisticated UI integration, as different functionality accesses specific services (see details below).

Examples of communication protocols that enable the import of a list of affected elements from the external sources include:

Systems that have the affected element related information can export the list to a file. The file can be formatted to the CSV format or the list can be exported in CSV format itself. The list of elements can be imported into the request scope of an ongoing litigation or an impending litigation context.

An LDAP browser-like interface searches people details and imports a list via LDAP protocol integration.

For external sources that expose Web services interfaces, implementing a Web services client and importing a list of affected elements returned. An example Web service operation is: List returnList getElements(List filterList). This is a generic operation and depends on source side implementations, i.e. Web services exposed. FilterList is a generic list of filter criteria that can be sent to the source service provider. ReturnList is a list of elements returned and element type.

For external sources exposing other non-standard interfaces, implementing integration glue code, i.e. connectors, that bridge between standard Web services APIs and native source side service provider APIs to extract and import the list of affected elements.

Examples of user interface actions to trigger or execute the import of the affected list using the above communication protocols include the following:

FIG. 1 is screen shot showing an import through CSV files according to the invention. In FIG. 1, an element type can comprise a person, system, or record type. The file to import is selected from the file system. A preview of the imported list is provided. The legal team can then decide which items in the imported list are to be included in the request scope. This decision can also be deferred until all elements are imported. The list of elements in the CSV file can be created or filtered based on any appropriate litigation specific parameters, but in that case those parameters are enforced by the user creating the CSV file content.

FIG. 2 is screen shot showing an import using a mailing list lookup according to the invention. In FIG. 2, a distribution list is selected. A preview of the imported list is provided. This list includes all elements (email addresses) included in the distribution list. Any filtering based on litigation context specific parameter can be applied at that point. The legal team can decide which items in the imported list are to be included in the request scope. This decision can also be deferred until all elements are imported.

FIG. 3 is a screen shot showing an import using a Web Service lookup according to the invention. In FIG. 3, a list of Web services that are available for access in the context of litigation can be pre-configured, so it is easily accessible to a user after that. A preview of the imported list is provided. In this case, a number (potentially all) of the parameters known about the litigation context were passed as input parameters to the Web Service, which means that the system had the other end at the ability to filter the list down to reflect only the appropriate affected elements. The legal team can also decide which items in the imported list are to be included in the request scope. This decision can also be deferred until all elements are imported.

FIG. 4 is a screen shot showing an import using a Web Service based lookup via Connectors. Connectors provide additional filters, defined per connector, that allow the end user to refine a selection further before importing the affected list, through a simple iterative process of trial and error. The user can apply specific filters, and the Web Service will provide both the corresponding list and additional comments on how the filters were understood (or not) and applied. A selection may be made from a list of connectors that are configured with external sources of information on affected people, systems, and record types that are accessible in the context of litigation. This model may support continuous mode for certain systems, where the affected list source systems regularly provide any update to the lists that are being imported. If the mode is continuous, then the search results and selection area are not shown. The search criteria are stored in the continuous mode. Conflict resolution is automatically performed based on configured rules. A filter area provides query templates to use for search based upon connector configuration. The criteria are saved if the system is in the continuous mode. The user can refine the filter criteria.

FIG. 5 is a screen shot showing an import using an LDAP lookup according to the invention. In FIG. 5, a configured list of LDAP servers that are accessible in the context of litigation is shown. If the mode is continuous, then the search results and selection area are not shown. The search criteria are stored in the continuous mode. Conflict resolution is automatically performed based on configured rules. A filter area provides query templates to use for search based upon connector configuration. The criteria are saved if the system is in the continuous mode. The user can refine the filter criteria.

In any of the examples of FIGS. 1-5, described above, an additional user interface can be added to setup automatic refresh of the affected list lookup by configuring a start date allowing the user to select a date, defaulting to today; a refresh period expressed in, for example, days, weeks, months; and an end date, which can be empty, which indicates refresh indefinitely.

Once these three parameters are configured, the corresponding affected elements lookup source is refreshed using the pre-configured parameters on the following dates:
start date
start date+refresh period, start date+2*refresh period, etc.
Until the end date, if any, is reached. For example:
If
  Start date=06/02/08,
  Period=1 week,
  End date=6/30/08,
Then
  The affected list is automatically refreshed on the following dates: 6/2/08, 6/9/08, 6/16/08. 6/23/08, 6/30/08.

Implementation of conflict resolution between different affected lists imported in a request scope includes the following example:
Keep the union of all elements; always add external elements, or any other similar rule driven by rules engine that doesn't require any human review or approval.
Initially, keep the union of all elements, but trigger workflows to resolve conflicts based on configured rule sets.
Trigger workflows before the external elements are included into request scope. In this case, the imported elements stay in a pending state and are added to the request scope only when approved. Elements are added only after completion of the workflow.
Keep the union of all elements, but allow manual override and track where the inclusion, modification, or deletion of elements from external sources happened.
Keep the union of all elements, and track external sources when the same element came from multiple sources. For example, if Person A is added because of a list imported by Attorney A, as well as by Attorney B. It is useful to know and record this fact.

Additional implementations of conflict resolution between different affected lists, where the same external source is imported at different point in time include the following example:
Use a reference count to keep track of which source added which elements, and remove elements that are no longer included in any of their original sources of affected elements. Such change should be tracked and auditable, and may require review by a user or it may be fully automated, depending the audit and check and balance level used by the legal team An implementation of a mechanism for tracking, displaying, and reporting on the change history of each element is provided in the following example:
Affected people details to be captured from external sources:
  Last name, first name, email, login Identifier, date of inclusion, date of modification, reason, litigation context identifier, request scope identifier
Affected system details to be captured from external sources:
  Name, unique Identifier, date of inclusion, date of modification, reason, list of related record types, list of related people, litigation context identifier, request scope identifier
Record Type list details to be captured from external sources:
  Record type, date of inclusion, date of modification, reason, litigation context identifier, request scope identifier
People Master List comprising a union of affected people across all request scopes associated with an ongoing litigation or an impending litigation context. People can be included because of explicit inclusion; and people can be included because of their association with systems. The master list also indicates which follow-up actions have already been taken regarding an affected person, for example sending a legal hold, setting a preservation plan, setting and fulfilling collections, interviewing the person, etc. This additional context may also be critical to decide how to manage the lifecycle of that person in the affected list.
System Master List comprising a union of affected systems across all request scopes associated with an ongoing litigation or an impending litigation context. Systems can be included because of explicit inclusion. Systems can also be included because of their association with record types. The master list also indicates which follow-up actions have already been taken regarding an affected system, for example setting a preservation plan, setting and fulfilling collections, and interviewing the system steward. This additional context may be critical to also decide how to manage the lifecycle of that system in the affected list.

Record Type Master List comprising a union of affected record types across all request scopes associated with an ongoing litigation or an impending litigation context. The record type list can also be included because of an association with systems.

Various reports, including for example:
- List of external request scopes per legal matter (litigation context), across selected legal matters (litigation contexts). Drill down to details of the external request scope, i.e. source of inclusion.
- External request scope with the following details: litigation context identifier; request scope Identifier; external element reference with drill down to details, including affected people details, affected system details, and affected record type details; and affected element details that may include the history of changes, and reasons for inclusion, including which source of affected elements they were referred from, and when.
- Filter Criteria, including: litigation context identifier; selected time duration; and element type, i.e. affected people, system, and record type.

FIG. 6 is a screen shot showing an example of implementation of the ability to alert on the change of request scope according to the invention. In the example of FIG. 6, the head of litigation for Legal Matter XYZ Vs. PQR wants to know when new affected people are added to the request scope, and the resulting scope change is indicated with regard to three added people: Jane Ho, Joe Blow, and Alice Chang, connection with two external sources: Distribution List: dev-all and LDAP Server 3, in the form of an alert. Each request scope change includes a mode, e.g. manual or continuous; an operator, e.g. John Smith or the system; and a type of notification to be sent to those individuals on the list, e.g. a Legal Hold Notice LH1 and an Individual Collection Notice IC1, IC2.

Figure 7:
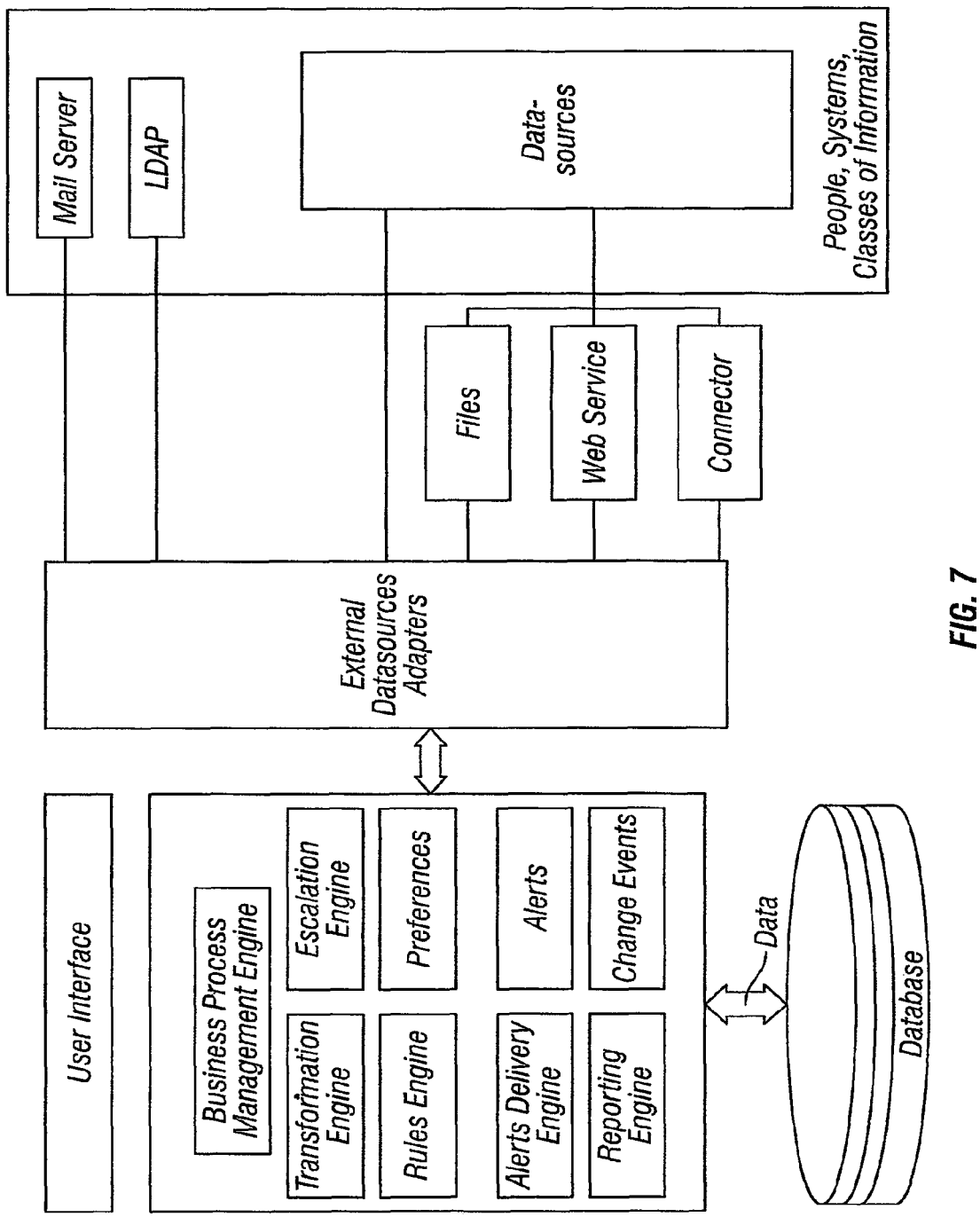
FIG. 7 is a screen shot showing an example implementation of the overall solution according to the invention.

FIG. 7 is a screen shot showing an example implementation of the overall solution according to the invention. The solution comprises of a software layer, called the external data sources adapters. These adapters are integration components that interact with various disparate external data sources and aggregate the data (people, system and classes of information) into the application that manages the business process around a litigation context. There are various ways of communicating with the sources of data as indicated in the diagram (but not restricted to the only ones shown). For example the file can be a formatted file generated by the source of data, system, the application managing the data or manually constructed file by a human being. The connector can practically integrate with any external system. Some of the interfaces shown in the diagram just represent the interaction with some well know data sources of information (like LDAP, mail servers) as examples.

The processing engine is the software that does the following
1. Collects and persists the data from various adapters and associates the elements (person, systems and classes of information) with request scopes and litigation contexts.
2. Transforms the data if needed (Transformation Engine)
   a. Example: Cleaning the data to make it suitable for being processed by the application
3. The Rules Engine manages all the configured rules in the application driving the request scoping business process in the context of a litigation.
4. Events Engine generates and tracks change in the request scope because of the import of data from external sources (or changes by the application or users).
5. Preference Engine manages the preferences of the users of the application managing the business processes around the litigation. For example the legal head of Legal Matter XYZ Vs. PQR wants to receive alerts via emails when the request scope changes
6. Escalation Engine converts change events into Alerts based on preferences and configured rules.
7. The Delivery Engine make sure the alerts are delivered to the appropriate users based on preferences. For example the legal head of Legal Matter XYZ Vs. PQR wants to receive alerts only on the application dashboard when the request scope changes and keep them around for a specified interval of time. The delivery engine makes sure that the alert is delivered to the users dashboard. The rules engines ensures that the alert stays on the dashboard only for the specified interval of time as configured by the user and then cleans them up.
8. Alert Engine manages the life cycle of the alert
9. The Business Process Management Engine manages the workflows and interaction between the various software components and users of the system. It allows the users of the system to manage the request scope life cycle in the context of litigation.
10. The user interface layer exposes all the functionality of the application managing the business process around the litigation context for creating and managing request scope for ongoing litigations or impending ones.
    a. Examples, but not restricted to:
        i. Managing the Adapter configurations
        ii. Managing the Search filters selected by the users for different adapters
        iii. Managing the frequency of import of data by various adapters
        iv. Managing the changes in the request scope because of import of data by various adapters
        v. Managing changes in the request scope manually after the imports are done Or configuring automated rules that take care of the changes
        vi. Managing conflicts and escalation based on configured rules
11. The reporting engine generates the different reports for the users to get insight into changes in the request scope and various other analytics that are possible with the aggregated data for the request scopes.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for external scoping of sources of information to determine affected people, systems, and classes of information in legal matters, comprising the steps of:

managing a list of external sources that are able to provide at least one list of affected elements that contain or have custody of evidence in legal matters, the external sources comprising sources external to a litigation management system, and the affected elements comprising people, systems, and classes of information in the legal matters, based upon specific legal matter parameters;

providing a communication protocol including one or more external datasource adapters to enable import of the at least one list of affected elements from the external sources into the litigation management system;

providing a user interface operable on a computer and configured to enable triggering or executing of the import of the at least one list of affected elements from the external sources using the communication protocol, wherein the user interface is further operable to enable selection of one or more affected elements in the at least one list of affected elements for import from the external sources into the litigation management system;

resolving, by the computer, conflicts between different lists of affected elements that are imported in a same request scope, wherein the conflicts arise if the different lists of affected elements identify a same affected element in the same request scope as part of differing affiliations and associations;

resolving, by the computer, conflicts between different lists of affected elements from a same external source which are imported at different points in time; and tracking, displaying, and reporting the external sources with regard to where in the external sources each element in the list of affected elements originated, modifications that occurred after an initial import, and all reasons provided by an operator via the user interface or an external source to justify an initial import or follow-up changes.

2. The method of claim 1, wherein the affected elements in the list of affected elements for the external sources comprise one or more of:

persons who are not part of the enterprise;

hosted systems or repositories that are not managed and maintained within a company;

persons, systems, and classes of information that were jointly involved in a same project, where a project describes any temporary association of persons from one or multiple organizations, using specific systems to store information in the form of a specific set of information classes, as used in a specific context of the project;

persons catalogs in LDAP, Active Directory, and other IT data stores of person information;

persons catalogs from HR systems, financial systems, and other information systems that maintain employee information via Web services calls/APIs;

persons lists defined based on an access list of structured applications via application specific APIs;

persons from mail servers; and isolated partial lists of persons, systems, and classes of information.

3. The method of claim 2, wherein the isolated partial lists of data sources comprise:

one or more systems that are dynamically provisioned in a company.

4. The method of claim 1, further comprising:

providing a tracking and conflict resolution for use in enterprises in which a large amount of data may not yet be classified or tracked in a central retention management program;

wherein as identification of potential evidence progresses, a specific silo of unclassified data is investigated and classified; and wherein at this point relevant classes of information become immediately known and are imported into a request scope.

5. The method of claim 4, further comprising:

importing relevant classes of information, comprising:

performing a CSV import of record types into the request scope;

managing association of the record types with external data sources imported; and including the external data sources into the request scope when external record types are included.

6. The method of claim 1, wherein managing the list of external sources further comprises:

integrating with LDAP, where a list of sources of affected elements is described as LDAP server details, including hostname, port number, and security credentials;

managing Web service URLs as a source of affected elements; and managing connector configuration URLs for connector type integration, where a connector provides a range of services that can be discovered through a single configuration service.

7. The method of claim 1, the providing a communication protocol further comprises:

exporting a list from systems that have affected element related information to a file;

wherein the file is either formatted to an CSV format or the list is exported in an CSV format itself; and wherein the list of elements is imported into a request scope of an ongoing litigation or an impending litigation context;

providing an LDAP browser-like interface to search for people details and import a list via LDAP protocol integration;

implementing a Web services client and importing a list of affected elements returned for external sources that expose Web services interfaces; and implementing integration glue code for external sources exposing other non-standard interfaces that bridge between standard Web services APIs and native source side service provider APIs to extract and import the list of affected elements.

8. The method of claim 1, wherein providing the user interface further comprises:

providing the user interface to import the at least one affected list through CSV files;

wherein an element type comprises a person, system, or record type;

wherein a file to import is selected from the file system;

wherein a preview of an imported list is provided;

wherein a legal team can then decide which items in the imported list are to be included in the request scope; and wherein the decision can optionally be deferred until all elements are imported.

9. The method of claim 1, wherein providing the user interface further comprises:

providing the user interface to import the at least one affected list using a mailing list lookup;

wherein a preview of the imported list is provided;

wherein the legal team can then decide which items on the imported list are to be included in the request scope; and wherein the decision can optionally be deferred until all elements are imported.

10. The method of claim 1, wherein providing the user interface further comprises:

providing the user interface to import the at least one affected list using a Web service lookup;

wherein a list of Web services that are available for access in context of litigation is provided;

wherein a list of some (or all) known standard parameters on the litigation context are provided as input parameters to the Web services, so the Web services can decide to use them as filter as appropriate;

wherein a preview of the imported list is provided;

wherein the legal team can then decide which items on the imported list are to be included in the request scope; and wherein the decision can optionally be deferred until all elements are imported.

11. The method of claim 1, wherein providing the user interface further comprises:

providing the user interface to import the at least one affected list using a Web service based lookup via connectors;

wherein a list of some (or all) known standard parameters on the litigation context are provided as input parameters to the Web services, so the Web services can decide to use them as filter as appropriate;

wherein the connectors provide additional filters, defined per connector, that allow an end user to refine a selection further before importing the affected list;

wherein a selection may be made from a list of connectors that are configured with eternal sources of information on affected people, systems, and record types that are accessible in the context of litigation;

optionally executing a continuous mode for certain systems, where the affected list source systems regularly provide any update to lists that being imported;

wherein if the mode is continuous, then search results and a selection area are not shown;

wherein the search criteria are stored in the continuous mode;

wherein conflict resolution is automatically performed based on configured rules;

wherein a filter area provides query templates to use for search based upon connector configuration;

wherein criteria are saved if the system is in the continuous mode; and wherein a user can refine the filter criteria.

12. The method of claim 1, wherein providing the user interface further comprises:

providing the user interface to import the at least one affected list using an LDAP lookup;

wherein a configured list of LDAP servers that are accessible in the context of litigation is shown;

wherein if a mode is continuous, then search results and selection area are not shown;

wherein search criteria are stored in the continuous mode;

wherein conflict resolution is automatically performed based on configured rules;

wherein a filter area provides query templates to use for search based upon connector configuration;

wherein criteria are saved if the system is in the continuous mode; and wherein a user can refine the filter criteria.

13. The method of claim 1, further comprising:

adding an additional user interface to setup automatic refresh of an affected list lookup by configuring parameters, the parameters specifying one or more of a start date, a refresh period, and an end date.

14. The method of claim 13, wherein once the parameters are configured, the method further comprises:

refreshing a corresponding affected elements lookup source using pre-configured parameters on the start date until the end date is reached; and automatically refreshing the affected list as appropriate.

15. The method of claim 1, further comprising:

implementing conflict resolution between different lists of affected elements imported in a request scope by any one or more of the following:

keeping a union of all elements, always adding external elements and combinations of similar rules driven by a rules engine;

initially, keeping the union of all elements, but triggering workflows to resolve conflicts based on configured rule sets;

triggering workflows before external elements are included into the request scope, wherein imported elements stay in a pending state and are added to the request scope only when approved, and wherein elements are added only after completion of the workflow;

keeping the union of all elements, but allowing manual override and tracking where inclusion, modification, or deletion of elements from external sources happened; and keeping the union of all elements, and tracking external sources when the same element came from multiple sources.

16. The method of claim 1, further comprising:

performing conflict resolution between different lists of affected elements, where the same external source is imported at different point in time; and using a reference count to keep track of which source added which elements, and removing elements that are no longer included in any of their original sources of affected elements.

17. The method of claim 1, further comprising:

providing a mechanism for tracking, displaying, and reporting on a change history of affected elements comprising:

affected people details to be captured from external sources, including any of last name, first name, email, loginId, date of inclusion, date of modification, reason, matterid, and request scope id;

affected system details to be captured from external sources, including any of name, unique IDentifier, date of inclusion, date of modification, reason, list of record types, list of people, matterid, and request scope id; and record type list details to be captured from external sources, including any of record type, date of inclusion, date of modification, reason, matterid, and request scope id.

18. The method of claim 1, further comprising:

providing a people master list comprising a union of affected individuals across all request scopes associated with an ongoing litigation or an impending litigation context;

wherein individuals can be included because of explicit inclusion and individuals can be included because of their association with systems; and wherein the master list also indicates which follow-up actions have already been taken regarding an affected individual by any of sending a legal hold, setting a preservation plan, setting and fulfilling collections, and interviewing the individual.

19. The method of claim 1, further comprising:

providing a system master list comprising a union of affected systems across all request scopes associated with an ongoing litigation or an impending litigation context;

wherein systems can be included because of explicit inclusion and can be included because of their association with record types;

wherein the master list also indicates which follow-up actions have already been taken regarding an affected system by any of setting a preservation plan, setting and fulfilling collections, and interviewing a system steward.

20. The method of claim 1, further comprising:

providing a record type master list comprising a union of affected record types across all request scopes associated with an ongoing litigation or an impending litigation context;

wherein the record type list can be included because of explicit inclusion; and wherein the record type list can also be included because of an association with systems.

21. The method of claim 1, wherein tracking, displaying, and reporting the external sources further comprises:

reporting one or more of:

a list of external request scopes per matter, across selected matters;

an external request scope with any of the following details: matter ID; request scope ID; external element reference with drill down to details, including affected people details, affected system details, and affected record type details; and affected element details that may include a history of changes, and reasons for inclusion, including which source of affected elements they were referred from, and when; and filter criteria, including any of matter ID; selected time duration; and element type.

22. An apparatus for external scoping of sources of information to determine affected people, systems, and classes of information in legal matters, comprising:

a computer;

a mechanism operable on the computer and configured to manage a list of external sources that are able to provide at least one list of affected elements that contain or have custody of evidence in legal matters, the affected elements comprising people, systems, and classes of information in the legal matters, based upon specific legal matter parameters;

a communication protocol that includes one or more external datasource adapters, wherein the communication protocol is operable on the computer and is configured to enable import of the at least one list of affected elements from the external sources;

a user interface operable on the computer and configured to trigger or execute the import of the at least one list of affected elements from the external sources using the communication protocol;

an application operable on the computer and configured to resolve conflicts between different lists of affected elements that are imported in a same request scope, wherein the conflicts arise if the different lists of affected elements identify a same affected element in the same request scope as part of differing affiliations and associations, and further configured to resolve conflicts between different lists of affected elements from a same external source which are imported at different points in time; and an events engine operable on the computer and configured to track, display, and report the external sources with regard to where each element in the list of affected elements originated, modifications that occurred after an initial import, and all reasons provided by an operator via the user interface or an external source to justify an initial import or follow-up changes.

23. The apparatus of claim 22, wherein the elements in the list of affected elements for the external sources comprise any of:

individuals who are not part of the enterprise, hosted systems or repositories that are not managed and maintained within a company;

individuals, systems, and classes of information that were jointly involved in the same project, where a project describes any temporary association of individuals from one or multiple organizations, using specific systems to store information in the form of a specific set of information classes, as used in a specific context of the project;

individuals catalogs in LDAP, Active Directory, and other IT data stores of individuals information;

individuals catalogs from HR systems, financial systems, and other information systems that maintain employee information via Web services calls/APIs;

individuals lists defined based on an access list of structured applications via application specific APIs;

individuals from mail servers; and isolated partial lists of data sources.

24. The apparatus of claim 23, wherein the isolated partial lists of data sources comprise:

one or more systems that are dynamically provisioned in a company.

25. The apparatus of claim 22, further comprising:

a tracking and conflict resolution mechanism configured for use in enterprises in which a large amount of data may not yet be classified or tracked in a central retention management program;

wherein as identification of potential evidence progresses, a specific silo of unclassified data is investigated and classified; and wherein at this point relevant classes of information become known and are immediately imported into a request scope.

26. The apparatus of claim 25, wherein the relevant classes of information are imported by mechanisms configured to:

perform a CSV import of record types into the request scope;

manage association of the record types with external data sources imported; and include the external data sources into the request scope when external record types are included.

27. The apparatus of claim 22, wherein the mechanism operable on the computer and configured to manage a list of external sources is further configured to:

integrate with LDAP, where a list of sources of affected elements is described as LDAP server details, including hostname, port number, and security credentials;

manage Web service URLs as a source of affected elements; and manage connector configuration URLs for connector type integration, where a connector provides a range of services that can be discovered through a single configuration service.

28. The apparatus of claim 22, wherein the communication protocol is further configured to:

export a list from systems that have affected element related information to a file; wherein the file is either formatted to an CSV format or the list is exported in an CSV format itself; and wherein the list of elements is imported into a request scope of an ongoing litigation or an impending litigation context;

provide an LDAP browser-like interface to search for people details and import a list via LDAP protocol integration;

implement a Web services client and importing a list of affected elements returned for external sources that expose Web services interfaces; and implement integration glue code for external sources exposing other non-standard interfaces that bridge between standard Web services APIs and native source side service provider APIs to extract and import the list of affected elements.

29. The apparatus of claim 22, wherein the user interface is further configured to:

trigger or execute the import of the at least one list of affected elements through CSV files;

wherein an element type comprises a person, system, or record type;

wherein a file to import is selected from the file system;

wherein a preview of an imported list is provided;

wherein a legal team can then decide which items in the imported list are to be included in the request scope; and wherein the decision can optionally be deferred until all elements are imported.

30. The apparatus of claim 22, wherein the user interface is further configured to:

trigger or execute the import of the at least one list of affected elements using a mailing list lookup;

wherein a preview of an imported list is provided;

wherein the legal team can then decide which items on the imported list are to be included in the request scope; and wherein the decision can optionally be deferred until all elements are imported.

31. The apparatus of claim 22, wherein the user interface is further configured to:

trigger or execute the import of the at least one list of affected elements using a Web service lookup;

wherein a list of Web services that are available for access in context of litigation is provided;

wherein a list of known standard parameters on the litigation context are provided as input parameters to the Web services, so it can decide to use them as filter as appropriate;

wherein a preview of an imported list is provided;

wherein the legal team can then decide which items on the imported list are to be included in the request scope; and wherein the decision can optionally be deferred until all elements are imported.

32. The apparatus of claim 22, wherein the user interface is further configured to:

trigger or execute the import of the at least one list of affected elements using a Web service based lookup via connectors;

wherein a list of some (or all) known standard parameters on the litigation context are provided as input parameters to the Web services, so it can decide to use them as filter as appropriate;

wherein the connectors provide additional filters, defined per connector, that allow an end user to refine a selection further before importing the at least one list of affected elements;

wherein a selection may be made from a list of connectors that are configured with eternal sources of information on affected people, systems, and record types that are accessible in the context of litigation;

execute a continuous mode for certain systems, where the affected list source systems regularly provide any update to lists that being imported;

wherein if the mode is continuous, then search results and a selection area are not shown;

wherein the search criteria are stored in the continuous mode;

wherein conflict resolution is automatically performed based on configured rules;

wherein a filter area provides query templates to use for search based upon connector configuration;

wherein criteria are saved if the system is in the continuous mode; and wherein a user can refine the filter criteria.

33. The apparatus of claim 22, wherein the user interface is further configured to:

trigger or execute the import of the at least one list of affected elements using an LDAP lookup;

wherein a configured list of LDAP servers that are accessible in the context of litigation is shown;

wherein if a mode is continuous, then search results and selection area are not shown;

wherein search criteria are stored in the continuous mode;

wherein conflict resolution is automatically performed based on configured rules;

wherein a filter area provides query templates to use for search based upon connector configuration;

wherein criteria are saved if the system is in the continuous mode; and wherein a user can refine the filter criteria.

34. The apparatus of claim 22, further comprising:

a mechanism configured to add an additional user interface to setup automatic refresh of an affected list lookup by configuring parameters that comprise a start date allowing a user to select a date, defaulting to today; a refresh period expressed in any of days, weeks, and months; and an end date, which can be empty, which indicates refresh indefinitely.

35. The apparatus of claim 34, wherein:

once the parameters are configured, a corresponding affected elements lookup source is refreshed using preconfigured parameters on the start date until the end date; and the affected list is automatically refreshed as appropriate.

36. The apparatus of claim 22, further comprising mechanisms configured to:

implement conflict resolution between different affected lists imported in a request scope by providing means for executing any of the following steps:

keep a union of all elements, always adding external elements and combinations of similar rules driven by a rules engine;

initially, keep the union of all elements, but triggering workflows to resolve conflicts based on configured rule sets;

trigger workflows before external elements are included into the request scope, wherein imported elements stay in a pending state and are added to the request scope only when approved, and wherein elements are added only after completion of the workflow;

keep the union of all elements, but allowing manual override and tracking where inclusion, modification, or deletion of elements from external sources happened; and keep the union of all elements, and tracking external sources when a same element came from multiple sources.

37. The apparatus of claim 22, further comprising:

mechanisms configured to perform conflict resolution between different affected lists, where a same external source is imported at different point in time; and mechanisms configured to use a reference count to keep track of which source added which elements, and removing elements that are no longer included in any of their original sources of affected elements.

38. The apparatus of claim 22, further comprising:

a mechanism configured to provide a mechanism for tracking, displaying, and reporting on a change history of each element, comprising mechanisms configured to:

capture affected people from external sources, including one or more of last name, first name, email, loginId, date of inclusion, date of modification, reason, matterid, and request scope id;

capture affected system details from external sources, including any of name, unique IDentifier, date of inclusion, date of modification, reason, list of record types, list of people, matterid, and request scope id; and capture record type list details from external sources, including any of record type, date of inclusion, date of modification, reason, matterid, and request scope id.

39. The apparatus of claim 22, further comprising:

a mechanism configured to provide a people master list comprising a union of affected people across all request scopes associated with an ongoing litigation or an impending litigation context;

wherein people are be included because of explicit inclusion and people can be included because of their association with systems; and wherein the master list also indicates which follow-up actions have already been taken regarding an affected person by any of sending a legal hold, setting a preservation plan, setting and fulfilling collections, and interviewing the person.

40. The apparatus of claim 22, further comprising:

a mechanism configured to provide a system master list comprising a union of affected systems across all request scopes associated with an ongoing litigation or an impending litigation context;

wherein systems can be included because of explicit inclusion and can be included because of their association with record types;

wherein the master list also indicates which follow-up actions have already been taken regarding an affected system by any of setting a preservation plan, setting and fulfilling collections, and interviewing a system steward.

41. The apparatus of claim 22, further comprising:

a mechanism configured to provide a record type master list comprising a union of affected record types across all request scopes associated with an ongoing litigation or an impending litigation context;

wherein the record type list can be included because of explicit inclusion; and wherein the record type list can also be included because of an association with systems.

42. The apparatus of claim 22, wherein the events engine comprises mechanisms configured to report one or more of:

a list of external request scopes per litigation context, across selected litigation contexts;

an external request scope with any of the following details: litigation context Identifier;

request scope Identifier; external element reference with drill down to details, including affected people details, affected system details, and affected record type details; and affected element details that may include a history of changes, and reasons for inclusion, including which source of affected elements they were referred from, and when; and filter criteria, including any of litigation context identifier; selected time duration; and element type.

* * * * *